United States Patent Office 3,518,178
Patented June 30, 1970

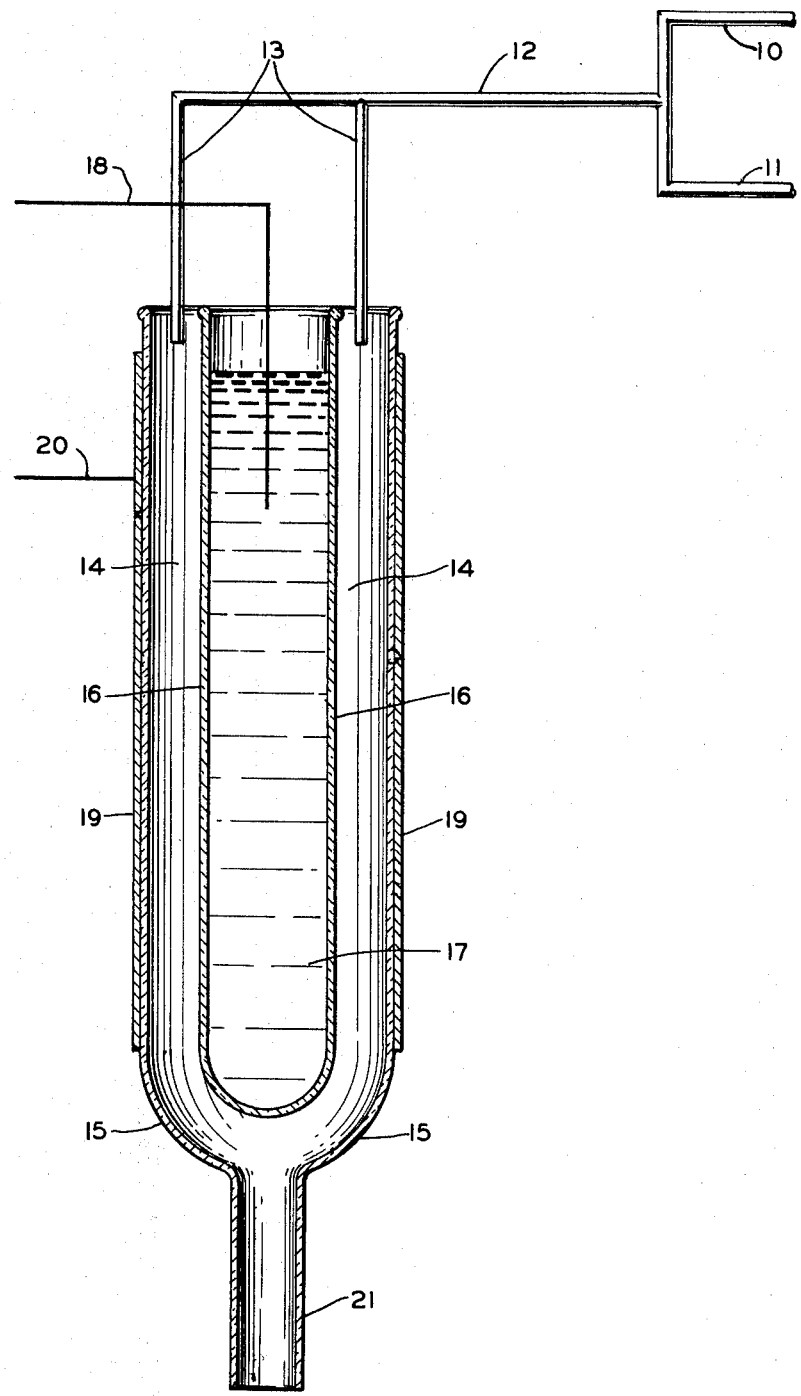

3,518,178
MANUFACTURE OF ALKYL AMINES USING A SILENT ELECTRIC DISCHARGE
James C. Burleson, St. Charles, and William F. Yates, Chesterfield, Mo., assignors to Monsanto Company, St. Louis, Mo., a corporation of Delaware
Filed Jan. 3, 1967, Ser. No. 606,756
Int. Cl. C07c 87/04
U.S. Cl. 204—177      4 Claims

ABSTRACT OF THE DISCLOSURE

Olefin hydrocarbons are converted to primary amines by subjecting the olefin hydrocarbons and ammonia under select conditions to a silent electric discharge.

---

The present invention relates to a process for the preparation of primary amines. More particularly, the present invention relates to a non-catalytic process for the conversion of ammonia and olefin hydrocarbons to primary amines.

The usual method of preparing alkyl amines is by the reaction of an alkyl chloride with ammonia. If it is desired to produce an alkyl amine from an alkyl hydrocarbon, such as an olefin hydrocarbon, it is necessary to chlorinate the alkyl hydrocarbon and then to react the alkyl chloride with ammonia. This has the disadvantage of requiring two steps to go from an alkyl hydrocarbon to an alkyl amine.

It is an object of the present invention to provide a novel process for the preparation of primary amines. A further object of the present invention is to provide a novel process for the reaction of olefin hydrocarbons with ammonia to produce primary alkyl amines. Another object of the present invention is to provide a new and novel non-catalytic process whereby primary alkyl amines may be produced by the direct reaction of olefin hydrocarbons and ammonia. Additional objects will become apparent from the following description of the invention herein disclosed.

The present invention, which fulfills these and other objects, is a process which comprises subjecting a mixture of ammonia and at least one olefin hydrocarbon to a silent electric discharge. By the term "silent electric discharge" as used herein, is meant an electrical discharge of the silent type characterized by a relatively high voltage, a relatively low current density and a relatively low gas temperature as contrasted to the low voltage, high current, and high temperatures of the arc discharge.

In order to further describe the present invention, reference is made to the accompanying drawing which is a diagrammatic representation of an apparatus particularly suited to carrying out the process of the present invention. Referring to the drawing, ammonia and at least one olefin hydrocarbon are fed through lines 10 and 11, respectively, into a common line 12 wherein these components become intimately mixed. The mixture passes through line 12 into one or a plurality of distributing tubes 13 which serve to introduce the mixture into a reaction chamber 14. The mixture of ammonia and olefin hydrocarbon is in the gaseous state when introduced into reaction chamber 14. Reaction chamber 14 is formed by the annular space between glass outer tube 15 and glass inner tube 16, which glass inner tube 16 is sealed at its lower end and filled with an electrolyte solution 17 which may be any suitable conducting solution. Glass outer tube 16 is surrounded by a conducting material 19 usually as a sheet of a conducting metal such as, for example, aluminum foil. Electrolyte solution 17 and conducting metal 19 are connected by means of conducting wires 18 and 20, respectively, with an electrical power source (not shown). The electrical power source is one capable of supplying as high as 20,000 volts and higher of alternating current with a frequency range of 30 cycles to 2 megacycles per second. The gas mixture introduced through lines 13 into reaction chamber 14 passes downward through reaction chamber 14 and a high intensity electrical field created by a silent electrical discharge between electrolyte 17 and conducting material 19. The effluent of reaction chamber 14 is discharged through discharge tube 21 whereby it flows to a recovery system (not shown).

To still further describe and to specifically illustrate the present invention, the following examples are presented. These examples are not to be construed as limiting the present invention in any manner.

EXAMPLE I

A mixture consisting of ammonia and ethylene in a mole ratio of 10:1 was subjected to a silent electric discharge in an apparatus substantially the same as that shown in the accompanying drawing. In this apparatus, aluminum foil was used as the electrode on the outer surface of glass outer tube 15 while a 1% $NaSO_4$ solution was used as the electrolyte within glass inner tube 16. The distance between the glass inner tube and the glass outer tube which represents the reaction zone, was approximately 0.060 inch and the length of the reaction zone was approximately 39 inches. Temperature within the reaction zone was approximately room temperature (70 to 80° F.). The pressure within the reaction zone was substantially atmospheric pressure. The residence time of the reactants within the reaction zone was approximately 12.5 minutes. The voltage applied to the silent electric discharge was approximately 15,000 volts and the frequency approximately 60 cycles per second. The field strength of the slient electric discharge within the reaction zone was 100,000 volts per centimeter. On analysis of the reaction zone effluent, it was found that a substantial amount of ethyl amine was produced, this amount representing approximately 90% by weight of the total reaction product.

EXAMPLE II

Example I was substantially repeated with the exception that the olefin hydrocarbon used was propylene. On analysis of the reaction zone effluent, it was found that substantial quantities of iso-propyl amine, normal propyl amine, and allyl amine were present, the three amines being present in a molar ratio of one to the other 2:1:1. The total of the three amines represented approximately 50% by weight of the total reaction product.

EXAMPLE III

Example I was again substantially repeated with the exception that the olefin hydrocarbon was cyclohexene. Also, the temperature within the reaction zone is approximately 80° F. Cyclohexylamine was produced in good yields.

EXAMPLE IV

Example I is again substantially repeated with the exception that the olefin hydrocarbon is n-pentene. Also, the temperature within the reaction zone is approximately 80° F. Significant quantities of pentyl amines are produced in good yields.

The feed materials to the process of the present invention consist of ammonia and at least one olefin hydrocarbon. Most often, the ammonia and olefin hydrocarbons are employed in a molar ratio of ammonia to olefin hydrocarbon within the range of 1:20 to 20:1. However, both higher and lower ratios ratios may be used if desired. Since formation of the primary amine from the ammonia and the olefin hydrocarbon generally requires one mole of each of the reactants, it is usually preferred to employ more nearly equimolar quantities of the ammonia and olefin hydrocarbon, for examle molar ratios of ammonia to olefin hydrocarbon of 1:10 to 10:1 are preferably employed.

The olefin hydrocarbons useful as feeds to the process of the present invention include virtually any of the mono-olefin hydrocarbons. These mono-olefin hydrocarbons may be straight-chain, branched-chain or cyclic in structure. As a practical matter, however, the process of the present invention is generally limited to operation with mono-olefin hydrocarbons which may be readily vaporized. Non-limiting examples of the mono-olefin hydrocarbons which are useful as feeds to the process of the present invention are ethylene, propylene, iso-propylene, butene-1, butene-2, iso-butylene, cyclobutene, n-pentenes, iso - pentenes, cyclopentene, methylcyclopentenes, n-hexenes, methylhexenes, cyclohexene, methylcyclohexenes, n - heptenes, ethylhexenes, dimethylhexenes, dimethylbutene, methylheptenes, methylethylheptenes, dimethylheptenes, cycloheptenes, methylcycloheptenes, ethylheptenes, and the like on up to and including straight and branched-chain, as well as cyclic olefin hydrocarbons of 20 carbon atoms and higher. If non-cyclic, the mono-olefin hydrocarbons may be terminally or internally unsaturated. Since the amine radical will preferentially attach adjacent the double bond of the mono-olefin hydrocarbon, the amine product desired will to a large extent dictate the choice of the particular mono-olefin hydrocarbon used as feed to the present process. In the preferred practice of the process of the present invention, the mono-olefin hydrocarbons of the feed are those containing 2 to 10 carbon atoms per molecule.

The temperatures at which the process of the present invention is practiced are not particularly critical. The specific temperature used is most often dicated by the temperature required to vaporize the mono-olefin hydrocarbon. When the mono-olefin hydrocrabon feeds to the present process are the normally gaseous mono-olefin hydrocarbons, the process of the present invention is most often operated at ambient temperatures (70° to 80° F.). As the molecular weight of the mono-olefin hydrocarbons in the feed increases, it is usually necessary to increase the reaction temperature in order to maintain the reactants in the gaseous state. As a practical matter, the present invention is seldom operated at temperatures above 600° F. With the above defined preferred feeds to the process of the present invention, temperatures within the range of 20 to 200° F. are usually employed.

As with temperature, pressure is not particularly critical to the operation of the present invention. The pressure is usually at or near atmospheric pressure, i.e., 0 to 5 p.s.i.g. However, it may be desired to operate at both higher and lower pressures in order to facilitate the mechanical carrying out of the process of the present invention. For example, it may be desired to operate the process of the present invention under reduced pressures, i.e., as low as 20 mm. Hg and lower, in order to facilitate vaporization of the reactants within the reaction zone and to retard the frequency of collision of the reactant particles within the reaction zone. On the other hand, it may be desired to operate at superatmospheric pressure, i.e., as high as 200 p.s.i.g. and higher, in order to reduce the vapor pressure of reactants within the reaction zone and to promote the collision frequency of the reactant particles. As a practical matter, the present invention is seldom operated at pressures lower than 1.5 p.s.i.a. or higher than 175 p.s.i.a.

The flow rate of the ammonia-mono-olefin hydrocarbon feed mixture through the high intensity electric field produced by the silent electric discharge most often is such as to result in a residence time of the reaction mixture within said high intensity electric field of 0.1 second to 20 minutes. Preferably, however, flow rates or other conditions, are adjusted to provide a residence time of 0.01 to 15 minutes for the reactant within the high intensity electric field.

The electrical conducting media through which the silent electric discharge in generated may consist of any material which may act as an electrode. Such materials include various metals such as the aluminum foil mentioned above or various electrolytic solutions such as the above-mentioned sodium sulfate solution. The two electrical conducting media used may be the same or different depending upon the configuration and construction of the apparatus used in carrying out the process of the present invention. Since materials and electrolytic solutions capable of conducting electricity and as acting as electrodes are well known to the art, no further discussion of such conducting media is believed necessary herein.

An insulating medium generally is required between the two electrodes employed in providing the silent electric discharge of the process of the present invention. In the apparatus shown in the accompanying drawing, this insulating medium is provided by glass tubes 15 and 16 which each provide a layer of glass between the electrodes. It is not necessary that the electrodes be insulated from one another by two layers of insulation as in the apparatus of the drawing. It is only necessary that one insulating medium be provided and the reactants may be in direct contact with one of the electrodes. The choice of the insulating medium is not critical and is well within the ability of those skilled in the art. It is only necessary that the insulating material have a dielectric greater than that of the gaseous reactants. Included within this group of insulating materials are glass, various ceramic materials and the like.

In providing the silent electric discharge of the process of the present invention, a field strength voltage from about 20,000 to 150,000 volts per centimeter most often is required. "Field strength," as used herein, is the value obtained by dividing the voltage applied to the electrodes by the distance between the two electrodes and is a measure of the electromotive force within the reaction zone. The field strength required will vary somewhat with the distance between the electrodes, the residence time and the reactants involved, as well as the efficiency of contact of the reaction mixture with the high intensity electrical field generated by the silent electric discharge. A preferred field strength for operation of the process of the present invention is one within the range of 30,000 to 125,000 volts per centimeter. Generally, the frequency of the electric current in the operation of the present process is within the range of 30 cycles to 2 megacycles per second. However, a frequency within the range of 40 to 100 cycles per second is preferred.

The apparatus used in carrying out the present invention may vary considerably. Any apparatus which will provide a silent electric discharge across a gap through which the reaction mixture of the present process may be passed will suffice. The gap may vary in distance from a small fraction of an inch to several inches. The optimum gap distance will vary with the electrode and the voltage applied, as well as other factors well known to the art. A useful apparatus is one of the general configuration illustrated by the accompanying drawing. Of course, any number of variations of such an apparatus may be made without departing from the spirit and scope of the present invention. The primary concern is to provide an apparatus which is consistent with efficient utilization of the electrical energy.

What is claimed is:

1. A non-catalytic process for the manufacture of primary amines which comprises subjecting a mixture of ammonia and at least one olefin hydrocarbon having 2–20 carbon atoms per molecule, said ammonia and olefin hydrocarbon being present in a molar ratio of 1:20 to 20:1 to a silent electric discharge having a field strength in the range of 20,000 to 150,000 volts per centimeter and wherein the frequency of the applied voltage is within the range of 30 cycles to 2 megacycles per second and wherein the reaction is carried out at a temperature within the range of 20 to 600° F. and at a pressure within the range of 20 to 600° F. and at a pressure within the range of 1.5 to 175 p.s.i.a. and wherein the residence time of said ammonia and olefin hydrocarbon within the field of the silent electric discharge is within the range of 0.1 to 20 minutes.

2. The process of claim 1 wherein the ammonia and olefin hydrocarbon are in a molar ratio of 1:10 to 10:1.

3. The process of claim 1 wherein the temperature is within the range of 20 to 200° F. and the pressure is substantially atmospheric pressure.

4. The process of claim 1 wherein the olefin hydrocarbons have 2 to 10 carbon atoms per molecule.

References Cited

UNITED STATES PATENTS

| | | | |
|---|---|---|---|
| 2,191,797 | 2/1940 | Matheson | 204—168 |
| 2,749,298 | 6/1956 | Thomas | 204—177 |
| 2,944,951 | 7/1960 | Moe et al. | 204—165 |
| 3,205,162 | 9/1965 | MacLean | 204—312 |

ROBERT K. MIHALEK, Primary Examiner

U.S. Cl. X.R.

260—583